United States Patent
Yang et al.

(10) Patent No.: US 12,131,709 B2
(45) Date of Patent: *Oct. 29, 2024

(54) DYNAMIC BACKLIGHT CONTROL METHOD, DYNAMIC BACKLIGHT MODULE, AND STORAGE MEDIUM

(71) Applicant: HUIZHOU VISION NEW TECHNOLOGY CO., LTD., Guangdong (CN)

(72) Inventors: Yuqi Yang, Guangdong (CN); Jinlong Liu, Guangdong (CN); Jianlin Li, Guangdong (CN)

(73) Assignee: HUIZHOU VISION NEW TECHNOLOGY CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/003,902

(22) PCT Filed: Jul. 1, 2021

(86) PCT No.: PCT/CN2021/104059
§ 371 (c)(1),
(2) Date: Dec. 29, 2022

(87) PCT Pub. No.: WO2022/002208
PCT Pub. Date: Jan. 6, 2022

(65) Prior Publication Data
US 2023/0317022 A1  Oct. 5, 2023

(30) Foreign Application Priority Data
Jul. 1, 2020  (CN) .............. 202010625653

(51) Int. Cl.
*G09G 3/34* (2006.01)

(52) U.S. Cl.
CPC ... *G09G 3/3413* (2013.01); *G09G 2320/0626* (2013.01)

(58) Field of Classification Search
CPC ......... G09G 3/3413; G09G 2320/0242; G09G 2320/0626; G09G 2310/0235
See application file for complete search history.

(56) References Cited

U.S. PATENT DOCUMENTS

2003/0214725 A1* 11/2003 Akiyama ............ G09G 3/3607
359/640
2005/0093815 A1  5/2005 Jen et al.
(Continued)

FOREIGN PATENT DOCUMENTS

| CN | 101840686 A | 9/2010 |
|---|---|---|
| CN | 102064171 A | 5/2011 |

(Continued)

OTHER PUBLICATIONS

International Search Report in International application No. PCT/CN2021/104059, mailed on Sep. 15, 2021.
(Continued)

*Primary Examiner* — Yuzhen Shen
(74) *Attorney, Agent, or Firm* — PV IP PC; Wei Te Chung

(57) ABSTRACT

A dynamic backlight control method, a dynamic backlight module, and a storage medium are provided in the present application. A lamp bead of the dynamic backlight module includes a green chip and at least two blue chips. The dynamic backlight control method includes: receiving a source signal; and when the source signal is a pure blue signal, turning off the green chip, and driving more than two of the blue chips to output blue light.

17 Claims, 2 Drawing Sheets

(56) References Cited

U.S. PATENT DOCUMENTS

| | | | |
|---|---|---|---|
| 2009/0281604 A1* | 11/2009 | De Boer | A61M 21/00 345/83 |
| 2010/0188322 A1 | 7/2010 | Furukawa | |
| 2011/0063335 A1 | 3/2011 | Wang et al. | |
| 2011/0267381 A1 | 11/2011 | Yamazaki et al. | |
| 2012/0001947 A1 | 1/2012 | Chu-Ke et al. | |
| 2014/0253562 A1* | 9/2014 | Yaras | G09G 3/342 315/297 |
| 2015/0243228 A1 | 8/2015 | Kimura | |
| 2016/0091151 A1* | 3/2016 | Itoi | G02B 6/0068 362/612 |

FOREIGN PATENT DOCUMENTS

| | | |
|---|---|---|
| CN | 103838035 A | 6/2014 |
| CN | 104133320 A | 11/2014 |
| CN | 105513559 A | 4/2016 |
| CN | 106707623 A | 5/2017 |
| CN | 107527896 A | 12/2017 |
| CN | 208188528 U | 12/2018 |
| CN | 110456565 A | 11/2019 |
| CN | 111739478 A | 10/2020 |

OTHER PUBLICATIONS

Written Opinion of the International Search Authority in International application No. PCT/CN2021/104059, mailed on Sep. 15, 2021.

Chinese Office Action issued in corresponding Chinese Patent Application No. 202010625653.4 dated Nov. 22, 2021, pp. 1-6.

European Search Report in European application No. 21832799.7, mailed on Apr. 18, 2024.

* cited by examiner

DYNAMIC BACKLIGHT CONTROL METHOD, DYNAMIC BACKLIGHT MODULE, AND STORAGE MEDIUM

CROSS-REFERENCE TO RELATED APPLICATION

This application is a National Phase of PCT Patent Application No. PCT/CN2021/104059 having international filing date of Jul. 1, 2021, which claims the benefit of priority of Chinese Patent Application No. 202010625653.4 filed on Jul. 1, 2020. The contents of the above applications are all incorporated by references as if fully set forth herein in their entirety.

BACKGROUND OF DISCLOSURE

Technical Field

The present application relates to a technical field of computers, and in particular, to a dynamic backlight control method, a dynamic backlight module, and a storage medium.

Description of Prior Art

A liquid crystal display (LCD) backlight method includes a static backlight and a color dynamic backlight, while the color dynamic backlight includes a blue-green dynamic backlight, a red-green-blue (RGB) dynamic backlight, etc. Wherein, the static backlight means that backlight is white; and the color dynamic backlight is to use a combination of chips with different colors to emit light (sometimes phosphor is also used).

When a blue field signal needs to be output, the color dynamic backlight can ensure purity of blue dots compared with the static backlight.

BRIEF SUMMARY OF DISCLOSURE

A main purpose of an embodiment of the present application is to provide a dynamic backlight control method, a dynamic backlight module, and a storage medium, which aims to solve a problem of reducing brightness of a blue field when dynamic backlight ensures purity of blue dots.

In one aspect, a dynamic backlight control method is provided in an embodiment of the present application, the dynamic backlight control method is applied to a dynamic backlight module, and a lamp bead of the dynamic backlight module comprises a green chip and at least two blue chips, and the dynamic backlight control method comprises:

receiving a source signal; and
turning off the green chip when the source signal is a pure blue signal, and driving more than two of the blue chips to output blue light.

Optionally, the lamp bead of the dynamic backlight module further comprises red phosphor; and
the red phosphor comprises at least one of nitride, fluoride, or silicate.

Optionally, the lamp bead of the dynamic backlight module comprises at least three of the blue chips;
correspondingly, the step of turning off the green chip when the source signal is the pure blue signal, and driving more than two of the blue chips to output the blue light comprises:
obtaining brightness requirement information according to the pure blue signal when the source signal is the pure blue signal, and determining a first driving number of the blue chips according to the brightness requirement information, and the first driving number is more than two; and
turning off the green chip and driving a corresponding number of the blue chips to output the blue light according to the first driving number.

Optionally, the lamp bead of the dynamic backlight module comprises at least three of the blue chips;
correspondingly, the step of turning off the green chip when the source signal is the pure blue signal, and driving more than two of the blue chips to output the blue light comprises:
obtaining a first reception time of receiving the pure blue signal when the source signal is the pure blue signal, and determining a second driving number of the blue chips according to the first reception time, and the second driving number is more than two; and
turning off the green chip and driving a corresponding number of the blue chips to output the blue light according to the second driving number.

Optionally, after the step of receiving the source signal, the dynamic backlight control method further comprises:
determining one target chip from each blue chip when the source signal is a mixed color signal; and
driving the target chip to output the blue light and turning off other blue chips except the target chip.

Optionally, the step of determining the target chip from each blue chip when the source signal is the mixed color signal comprises:
obtaining a cumulative use duration of each blue chip when the source signal is the mixed color signal, and determining the target chip from each blue chip according to the cumulative use duration of each blue chip.

Optionally, the step of determining the target chip from each blue chip when the source signal is the mixed color signal comprises:
obtaining a second reception time of receiving the mixed color signal when the source signal is the mixed color signal, and determining the target chip from each blue chip according to the second reception time.

In a second aspect, a dynamic backlight module is further provided in the embodiment of the present application, a lamp bead of the dynamic backlight module comprises a green chip and at least two blue chips; the dynamic backlight module further comprises a processor and a memory, and the memory stores a computer program, and the computer program performs steps of the above-mentioned dynamic backlight control method when executed by the processor.

In a third aspect, a storage medium is further provided in the embodiment of the present application, and the storage medium stores a computer program, and the computer program performs the steps of the above-mentioned dynamic backlight control method when executed by a processor.

The lamp bead of the dynamic backlight module is equipped with the green chip and more than two of the blue chips in the embodiment of the present application, when the obtained source signal is the pure blue signal, the green chip is turned off, and more than two of the blue chips are driven to output the blue light. Because a plurality of the blue chips jointly output the blue light, overall brightness of the blue field can be improved. Moreover, actual blue light components have not been changed, and color coordinates will not deviate due to a brightness increase, thus ensuring purity of blue dots.

Realization, functional features, and advantages of a purpose of the present application will be further described with reference to accompanying drawings in combination with the embodiments.

DETAILED DESCRIPTION OF PREFERRED EMBODIMENTS

Technical solutions in embodiments of the present application will be clearly and completely described below in combination with the accompanying drawings in the embodiments of the present application. Obviously, the described embodiments are only part of the embodiments of the present application, not all of them. Based on the embodiments in the present application, all other embodiments obtained by those skilled in the art without making creative work fall within a scope of protection of the present application.

It should be noted that if the embodiment of the present application involves directional instructions (such as "up", "down", "left", "right", "front", "rear", . . . ), then the directional instructions are only used to explain a relative position relationship and a motion situation between components under a specific attitude. If the specific attitude changes, the directional instructions will change accordingly.

In addition, the technical solutions between various embodiments can be combined with each other, but it must be based on that those skilled in the art can realize it. When the combination of technical solutions is contradictory or impossible, it should be considered that the combination of technical solutions does not exist and is not within the scope of protection of the present application.

It should be understood that specific embodiments described here are only used to explain the present application and are not used to limit the present application.

Figure 1:
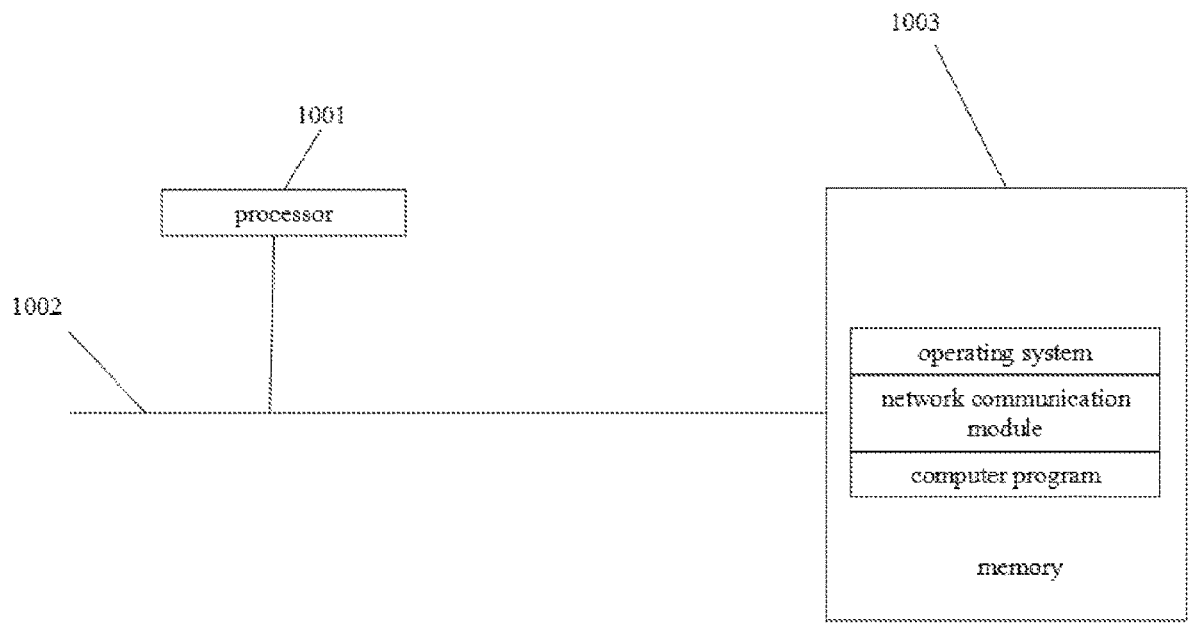
FIG. 1 is a schematic structural diagram of a dynamic backlight module involved in an embodiment of the present application.

A dynamic backlight control method involved in the embodiments is applied to a dynamic backlight module, and the dynamic backlight module can be arranged on a display screen. Referring to FIG. 1, FIG. 1 is a schematic structural diagram of the dynamic backlight module in the embodiment of the present application. In the embodiment of the present application, the dynamic backlight module includes a processor 1001 (such as a central processing unit, CPU), a communication bus 1002, and a memory 1003. Wherein, the communication bus 1002 is used to realize connection and communication between these components. The memory 1003 can be a high-speed random access memory (RAM) or a non-volatile memory, such as a disk memory. The memory 1003 can optionally be a storage device independent of the aforementioned processor 1001. In addition, the dynamic backlight module includes lamp beads, and each of the lamp beads includes a green chip and more than two blue chips (not shown in FIG. 1), so as to output corresponding pure color light. Of course, those skilled in the art can understand that a hardware structure shown in FIG. 1 does not constitute a limitation of the present application.

Please continue to refer to FIG. 1, the memory 1003 as a readable storage medium in FIG. 1 may include an operating system and a computer program. The processor 1001 can invoke the computer program stored on the memory 1003 and realize the dynamic backlight control method in the embodiment of the present application.

The dynamic backlight control method is provided in the embodiment of the present application.

Figure 2:
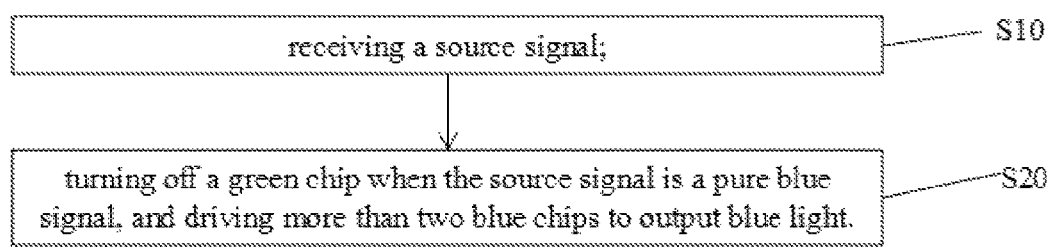
FIG. 2 is a flowchart of a dynamic backlight control method in a first embodiment of the present application.

Please refer to FIG. 2, FIG. 2 is a flowchart of the dynamic backlight control method in a first embodiment of the present application.

In the embodiment, the dynamic backlight control method is applied to the dynamic backlight module, and the dynamic backlight module includes the green chip and at least two of the blue chips. The dynamic backlight module is connected with a liquid crystal switch of a liquid crystal glass color resistance layer, and the dynamic backlight control method includes following steps:

step S10: receiving a source signal.

A backlight method of a liquid crystal display (LCD) includes a static backlight and a color dynamic backlight, while the color dynamic backlight includes a blue-green dynamic backlight, a red-green-blue (RGB) dynamic backlight, etc. Wherein, the static backlight means that backlight is white; and the color dynamic backlight is to use a combination of chips with different colors to emit light. For example, the red-green-blue RGB dynamic backlight uses a red chip, a green chip, and a blue chip together, and each color chip can be driven independently to output corresponding color light. The blue-green dynamic backlight uses a blue chip, a green chip, and red phosphor in combination, and the blue chip and the green chip can be driven independently to output corresponding color light. Wherein, the red phosphor includes at least one of nitride, fluoride (potassium hexafluoromanganate (KSF)), or silicate, and of course, it can also be other types of red phosphors. When a blue field signal needs to be output, for the static backlight, due to a wider passband range of a blue-green filter, this will lead to that green light in the static backlight will also be output through blue pixels when only a blue LCD switch is turned on, resulting in blue-green light crosstalk. As for the color dynamic backlight, only the blue chip is driven in the backlight, and the green chip is turned off. There is no blue-green light crosstalk, so purity of blue field color dots is improved, and then color gamut of a whole machine is improved. However, because the green light is suppressed and human eyes are more sensitive to the green light, brightness will be reduced for users, thus affecting the user's perception. Specifically, the blue-green dynamic backlight is taken as an example, as shown in table 1, which is a color field brightness comparison table between the static backlight and the blue-green dynamic backlight.

Table 1: a color field brightness comparison table between the static backlight and the blue-green dynamic backlight

|  | red field brightness | green field brightness | blue field brightness | mixed color field brightness |
|---|---|---|---|---|
| static backlight | 145.07 | 381.53 | 85.512 | 621.29 |
| blue-green dynamic backlight | 141.65 | 368.52 | 23.845 | 534.015 |
| brightness difference | 2.36% | 3.41% | 72.12% | 14.05% |

According to table 1, in a blue field, compared with the static backlight, the blue field brightness of the blue-green dynamic backlight decreases significantly. In view of this, the dynamic backlight control method is provided in the embodiment, the lamp bead of the dynamic backlight module is provided with the green chip and more than two of the blue chips. When the obtained source signal is the pure blue signal, the green chip is turned off, and more than two of the blue chips are driven to output the blue light. Because the plurality of blue chips jointly output the blue light, so that overall brightness of the blue field is improved. Moreover, actual blue light components have not been changed, and color coordinates will not deviate due to a brightness increase, thus ensuring purity of blue dots.

Figure 3:
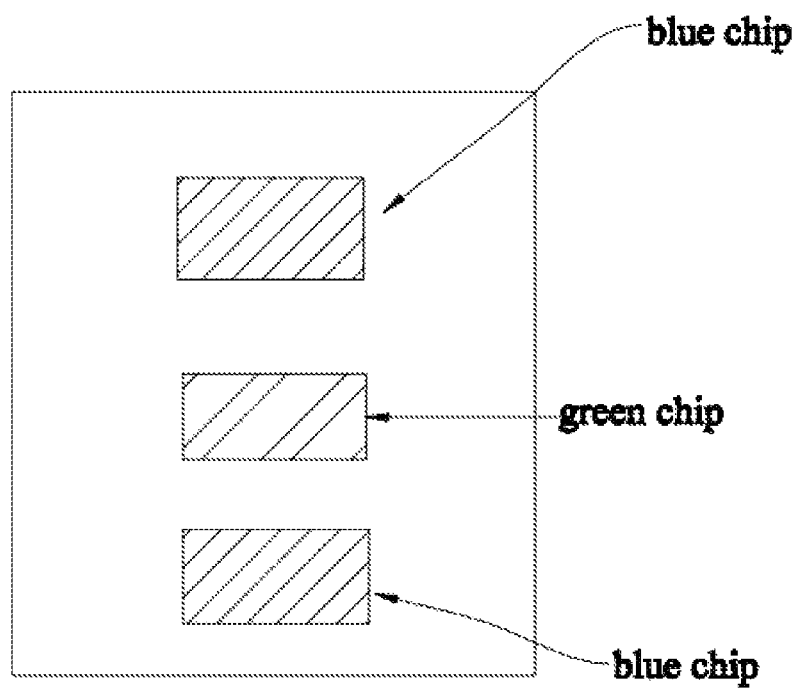
FIG. 3 is a schematic diagram of a lamp bead of a blue-green dynamic backlight module of the dynamic backlight control method involved in the first embodiment of the present application.

The dynamic backlight control method in the embodiment is applied to the dynamic backlight module, and the dynamic backlight module can be arranged on the LCD, and the blue-green dynamic backlight module is taken as an example to illustrate. It should be noted that a lamp bead of a conventional blue-green dynamic backlight module is illuminated by a green chip, a blue chip, and red phosphor in combination. In the embodiment, a lamp bead of the blue-green dynamic backlight module is provided with more than (here "more than" includes the original number, same below) two of the blue chips and one green chip (of course, it can also be set to more than two), and red phosphor is further provided. For convenience of illustration, the lamp bead of the blue-green dynamic backlight module in this embodiment is illustrated by taking two of the blue chips as an example, while the red phosphor adopts KSF phosphor. Specifically referring to FIG. 3, FIG. 3 is a schematic diagram of the lamp bead of the blue-green dynamic backlight module involved in the embodiment. The lamp bead of the blue-green dynamic backlight module includes two of the blue chips, one green chip, and the KSF phosphor (not shown in figures). Each chip can be driven independently to output corresponding color light. Arrangements of the chips can be set according to actual situations. An arrangement in FIG. 3 cannot constitute a restriction on this scheme.

In the embodiment, when the blue-green dynamic backlight module is turned on, the source signal can be received, and the source signal is triggered based on a picture to be displayed on the LCD. When the source signal is obtained, a type of the source signal can be determined, and whether to drive/turn off each chip can be determined according to the type of the source signal.

Step S20: turning off the green chip when the source signal is the pure blue signal, and driving more than two of the blue chips to output the blue light.

In the embodiment, when the type of the source signal is the pure blue signal, it can be determined that the display screen is to display a blue field picture. According to the pure blue signal, the green chip is turned off by the blue-green dynamic backlight module, and green light of the green chip is stopped from outputting, which prevents a blue-green light crosstalk from happening. At a same time, more than two of the blue chips are driven to output the blue light. If the blue light normally participating in colored light mixing has a gray scale of 8 bit, in a case of non-pure blue field, only one of the blue chips needs to be driven. In the pure blue field, a maximum gray scale can reach 24 bit. It can be seen that at least one additional blue chip needs to be used to compensate brightness of the pure blue field. Through the blue light jointly output by the plurality of blue chips, the overall brightness of the blue field can be improved. Moreover, the actual blue light components have not been changed, and the color coordinates will not deviate due to the brightness increase, so as to ensure the purity of the blue dots.

Based on the first embodiment of the above-mentioned dynamic backlight control method, a second embodiment of the dynamic backlight control method is provided.

In the embodiment, the lamp bead of the dynamic backlight module includes at least three of the blue chips; correspondingly, the step S20 includes:

step A21: obtaining brightness requirement information according to the pure blue signal when the source signal is the pure blue signal, and determining a first driving number of the blue chips according to the brightness requirement information; and the first driving number is more than two.

In the embodiment, the lamp bead of the dynamic backlight module includes at least three of the blue chips. Generally speaking, the blue field brightness can be compensated by two of the blue chips. Of course, in actual situations, higher blue field brightness can be required. Specifically, the user can set a brightness requirement of the blue field through a remote controller or other equipment. When the pure blue signal is triggered, the pure blue signal includes the brightness requirement information. When the dynamic backlight module obtains the pure blue signal, the brightness requirement information can be obtained according to the pure blue signal, and the first driving number of the blue chips can be determined according to the brightness requirement information. A number of the blue chips to be driven subsequently can be determined by the first driving number. Of course, the first driving number is more than two, otherwise the brightness of the blue field cannot be guaranteed.

Step A22: turning off the green chip and driving a corresponding number of the blue chips to output the blue light according to the first driving number.

In the embodiment, when the first driving number is determined, the green chip is turned off, and the green chip stops outputting of the green light, and the corresponding number of the blue chips are driven to output the blue light according to the first driving number. For example, the lamp bead of the dynamic backlight module includes at least three of the blue chips and one green chip, the first driving number is two, and the green chip can be turned off; two of the blue chips are driven to output the blue light, and another one of the blue chips can be turned off.

Through the above-mentioned method, the corresponding number of the blue chips can be driven in the embodiment to output the blue light according to the brightness requirement, and different brightness requirements can be met based on a guarantee of the brightness of the blue field.

Based on the first embodiment of the above-mentioned dynamic backlight control method, a third embodiment of the dynamic backlight control method is provided in the present application.

In the embodiment, the lamp bead of the dynamic backlight module includes at least three of the blue chips; correspondingly, the step S20 includes:

step A23: when the source signal is the pure blue signal, a first reception time of receiving the pure blue signal is obtained, and a second driving number of the blue chips is determined according to the first reception time, and the second driving number is more than two.

In the embodiment, the lamp bead of the dynamic backlight module includes at least three of the blue chips. Generally speaking, the blue field brightness can be compensated by two of the blue chips. Of course, in actual situations, higher blue field brightness can be required. Specifically, different blue field brightness requirements can be set for different time periods, and different brightness requirements are corresponding to different driving numbers of blue chips. For example, from 20:00 to 6:00, the blue field brightness requirements are higher, and at least three of the blue chips need to be driven, while from 6:00 to 20:00, the blue field brightness requirements are relatively low, and only two of the blue chips need to be driven. In this regard, a corresponding relationship between the time period and the driving numbers of the blue chips can be set in advance. When the pure blue signal is received, the first reception time of receiving the pure blue signal will be obtained, and then the second driving number of the blue chips can be determined according to the first reception time and the set corresponding relationship. Through the second driving number, the number of the blue chips to be driven subsequently to output the blue light can be determined. Of course, the second driving number is more than two, otherwise, the brightness of the blue field cannot be guaranteed.

Step A24: turning off the green chip, and driving a corresponding number of the blue chips to output the blue light according to the second driving number.

In the embodiment, when the first driving number is determined, the green chip is turned off, and the green chip stops outputting of the green light, and the corresponding number of the blue chips are driven to output the blue light according to the first driving number. For example, the lamp bead of the dynamic backlight module includes at least three of the blue chips and one green chip, the second driving number is two, and the green chip is turned off; two of the blue chips are driven to output the blue light, and another one of the blue chips can be turned off.

Through the above-mentioned method, the corresponding number of the blue chips can be driven in the embodiment to output the blue light according to the reception time of the pure blue signal, and brightness requirements with different time periods can be met based on the guarantee of the brightness of the blue field.

Based on the first embodiment of the above-mentioned dynamic backlight control method, a fourth embodiment of the dynamic backlight control method of the present application is provided.

In the embodiment, after the step S10, the dynamic backlight control method further includes:

step A40: determining a target chip from each blue chip when the source signal is a mixed color signal.

In the embodiment, when the type of the source signal is the mixed color signal, it is determined that the display screen is to display a mixed color picture, that is, the blue light is mixed with light of other colors. When the blue light is mixed with the light of other colors, it can be considered that brightness of the blue light will be compensated by the light of other colors, so only one of the blue chips needs to be driven to output the blue light. In this regard, when the type of the source signal is the mixed color signal, the target chip is determined from each blue chip. And a determining process can be realized by different methods. For example, one blue chip is randomly selected from each blue chip and being determined as the target chip, or the target chip is determined according to a cumulative use duration of each blue chip, or the target chip is determined according to the reception time of the mixed color signal, etc.

Furthermore, the step A40 includes:

Step A41: obtaining the cumulative use duration of each blue chip when the source signal is the mixed color signal, and determining the target chip from each blue chip according to the cumulative use duration of each blue chip.

When the type of the source signal is the mixed color signal, the target chip can be determined according to the cumulative use duration of each blue chip. Specifically, the cumulative use duration of each blue chip can be obtained, and then a blue chip with a shortest cumulative use duration can be selected as the target chip from each blue chip according to the cumulative use duration of each blue chip. In this way, the use time of each blue chip can be balanced to prevent excessive loss of one certain blue chip.

Furthermore, the step A40 further includes:

Step A42: obtaining a second reception time of receiving the mixed color signal when the source signal is the mixed color signal, and determining the target chip from each blue chip according to the second reception time.

When the type of the source signal is the mixed color signal, the target chip is further determined according to the reception time of the mixed color signal. Specifically, a corresponding relationship between a time period and each blue chip can be set, that is, the blue chip to be used as the target chip in each time period is set in advance. For example, the dynamic backlight module includes three of the blue chips marked with B1, B2, and B3, respectively. Wherein, a time period from 0:00 to 8:00 is corresponding to B1 (that is, B1 is the target chip in this time period), a time period from 8:00 to 16:00 is corresponding to B2 (that is, B2 is the target chip in this time period), and a time period from 16:00 to 24:00 is corresponding to B3 (that is, B3 is the target chip in this time period). When the mixed color signal is received, the second reception time of receiving the pure blue signal is obtained, and the target chip is determined from each blue chip according to the second reception time and the set corresponding relationship. For example, the mixed color signal is received at 18:00, then B3 can be determined as the target chip. In this way, different blue chips can be determined as target chips in different time periods, which is conducive to balancing allocation of use period of each blue chip, and preventing excessive loss of one certain blue chip.

Of course, except for the above-mentioned examples, the target chip can also be determined by other method.

Step A50: driving the target chip to output the blue light and turning off other blue chips except the target chip.

In the embodiment, when the target chip is determined, the target chip is driven to output the blue light and the blue chips except the target chip are turned off. Of course, for chips of other colors, they can be driven or turned off according to a specific type of the mixed color signal.

Through the above-mentioned method, when the obtained source signal is the mixed color signal, one of each of the blue chips can be selected as the target chip, and the target chip can be driven to output the blue light, so as to meet requirements of color mixing.

In addition, a display device is further provided in the embodiment of the present application, and the display device includes the dynamic backlight module in the above-mentioned embodiments.

Wherein, for specific functions of the display device and implementing methods, various embodiments of the dynamic backlight control method of the present application can be referred to, which will not be repeated here.

In addition, a storage medium is further provided in the embodiment of the present application.

The storage medium of the present application stores a computer program, wherein the computer program performs the steps of the above-mentioned dynamic backlight control method when executed by a processor.

Wherein for the method realized when the computer program is executed, various embodiments of the dynamic backlight control method of the present application can be referred to, which will not be repeated here.

The above serial number of the embodiments of the present application is only for description and does not represent advantages and disadvantages of the embodiments.

Through the description of the above-mentioned embodiments, those skilled in the art can clearly understand that the above-mentioned embodiment method can be realized by means of software plus a necessary general hardware platform, of course, and it can also be realized by hardware; but in many cases, the former is a better implementation method. Based on this understanding, the technical solution of the present application, in essence, or a part that contributes to an existing technology, can be embodied in a form of a software product, which is stored in a storage medium (such as a ROM/RAM, a magnetic disc, an optical disc) as described above. It includes several instructions to enable a terminal device (which can be a mobile phone, a computer, a server, an air conditioner, or a network device, etc.) to perform the methods described in various embodiments of the present application.

The above-mentioned is only a preferred embodiment of the present application, and does not limit a patent scope of the present application. Under a concept of the present application, any equivalent structural transformation made by using contents of the description and drawings of the present application, or directly/indirectly applied in other related technical fields, are included in the patent protective scope of the present application.

What is claimed is:

1. A dynamic backlight control method, wherein the dynamic backlight control method is applied to a dynamic backlight module, and a lamp bead of the dynamic backlight module comprises a green chip and at least three blue chips, and the dynamic backlight control method comprises:

receiving a source signal; and turning off the green chip when the source signal is a pure blue signal, and driving more than two of the blue chips to output blue light;

wherein the step of turning off the green chip when the source signal is a pure blue signal, and driving more than two of the blue chips to output blue light comprises:

obtaining a first reception time of receiving the pure blue signal when the source signal is the pure blue signal, and determining a second driving number of the blue chips according to the first reception time, and the second driving number is more than two; and turning off the green chip and driving a corresponding number of the blue chips to output the blue light according to the second driving number; and wherein in a non-pure blue field, only one of the blue chips is to be driven, and in a pure blue field, a maximum gray scale reaches.

2. The dynamic backlight control method as claimed in claim 1, wherein the lamp bead of the dynamic backlight module further comprises red phosphor, and the red phosphor comprises at least one of nitride, fluoride, or silicate.

3. The dynamic backlight control method as claimed in claim 1, wherein the lamp bead of the dynamic backlight module comprises at least three of the blue chips;

correspondingly, the step of turning off the green chip when the source signal is the pure blue signal, and driving more than two of the blue chips to output the blue light comprises:

obtaining brightness requirement information according to the pure blue signal when the source signal is the pure blue signal, and determining a first driving number of the blue chips according to the brightness requirement information, and the first driving number is more than two; and turning off the green chip and driving a corresponding number of the blue chips to output the blue light according to the first driving number.

4. The dynamic backlight control method as claimed in claim 1, wherein after the step of receiving the source signal, the dynamic backlight control method further comprises:

determining one target chip from each blue chip when the source signal is a mixed color signal; and driving the target chip to output the blue light and turning off other blue chips except the target chip.

5. The dynamic backlight control method as claimed in claim 4, wherein the step of determining the target chip from each blue chip when the source signal is the mixed color signal comprises:

obtaining a cumulative use duration of each blue chip when the source signal is the mixed color signal, and determining the target chip from each blue chip according to the cumulative use duration of each blue chip.

6. The dynamic backlight control method as claimed in claim 5, wherein the step of determining the target chip from each blue chip when the source signal is the mixed color signal comprises:

obtaining a second reception time of receiving the mixed color signal when the source signal is the mixed color signal, and determining the target chip from each blue chip according to the second reception time.

7. A dynamic backlight module, wherein a lamp bead of the dynamic backlight module comprises a green chip and at least three blue chips, and the dynamic backlight module further comprises a processor and a memory; the memory stores a computer program, and the computer program performs following steps when executed by the processor:

receiving a source signal; and turning off the green chip when the source signal is a pure blue signal, and driving more than two of the blue chips to output blue light;

wherein the step of turning off the green chip when the source signal is a pure blue signal, and driving more than two of the blue chips to output blue light comprises:
    obtaining a first reception time of receiving the pure blue signal when the source signal is the pure blue signal, and determining a second driving number of the blue chips according to the first reception time, and the second driving number is more than two; and
    turning off the green chip and driving a corresponding number of the blue chips to output the blue light according to the second driving number; and
    wherein in a non-pure blue field, only one of the blue chips is to be driven, and in a pure blue field, a maximum gray scale reaches.

8. The dynamic backlight module as claimed in claim 7, wherein the lamp bead of the dynamic backlight module further comprises red phosphor, and the red phosphor comprises at least one of nitride, fluoride, or silicate.

9. The dynamic backlight module as claimed in claim 7, wherein the lamp bead of the dynamic backlight module comprises at least three of the blue chips;
    correspondingly, the step of turning off the green chip when the source signal is the pure blue signal, and driving more than two of the blue chips to output the blue light comprises:
    obtaining brightness requirement information according to the pure blue signal when the source signal is the pure blue signal, and determining a first driving number of the blue chips according to the brightness requirement information, and the first driving number is more than two; and
    turning off the green chip and driving a corresponding number of the blue chips to output the blue light according to the first driving number.

10. The dynamic backlight module as claimed in claim 7, wherein after the step of receiving the source signal, the steps further comprise following steps:
    determining one target chip from each blue chip when the source signal is a mixed color signal; and
    driving the target chip to output the blue light and turning off other blue chips except the target chip.

11. The dynamic backlight module as claimed in claim 10, wherein the step of determining the target chip from each blue chip when the source signal is the mixed color signal comprises:
    obtaining a cumulative use duration of each blue chip when the source signal is the mixed color signal, and determining the target chip from each blue chip according to the cumulative use duration of each blue chip.

12. The dynamic backlight module as claimed in claim 11, wherein the step of determining the target chip from each blue chip when the source signal is the mixed color signal comprises:
    obtaining a second reception time of receiving the mixed color signal when the source signal is the mixed color signal, and determining the target chip from each blue chip according to the second reception time.

13. A storage medium, wherein the storage medium stores a computer program, and the computer program performs following steps when executed by a processor:
    receiving a source signal; and
    turning off a green chip when the source signal is a pure blue signal, and driving more than two blue chips to output blue light;
    wherein the step of turning off the green chip when the source signal is a pure blue signal, and driving more than two of the blue chips to output blue light comprises:
    obtaining a first reception time of receiving the pure blue signal when the source signal is the pure blue signal, and determining a second driving number of the blue chips according to the first reception time, and the second driving number is more than two; and
    turning off the green chip and driving a corresponding number of the blue chips to output the blue light according to the second driving number; and
    wherein in a non-pure blue field, only one of the blue chips is to be driven, and in a pure blue field, a maximum gray scale reaches.

14. The storage medium as claimed in claim 13, wherein a lamp bead of a dynamic backlight module further comprises red phosphor, and the red phosphor comprises at least one of nitride, fluoride, or silicate.

15. The storage medium as claimed in claim 13, wherein a lamp bead of a dynamic backlight module comprises at least three of blue chips,
    correspondingly, the step of turning off the green chip when the source signal is the pure blue signal, and driving more than two of the blue chips to output the blue light comprises:
    obtaining brightness requirement information according to the pure blue signal when the source signal is the pure blue signal, and determining a first driving number of the blue chips according to the brightness requirement information, and the first driving number is more than two; and
    turning off the green chip and driving a corresponding number of the blue chips to output the blue light according to the first driving number.

16. The storage medium as claimed in claim 13, wherein after the step of receiving the source signal, the steps further comprise following steps:
    determining one target chip from each blue chip when the source signal is a mixed color signal; and
    driving the target chip to output the blue light and turning off other blue chips except the target chip.

17. The storage medium as claimed in claim 16, wherein the step of determining the target chip from each blue chip when the source signal is the mixed color signal comprises:
    obtaining a cumulative use duration of each blue chip when the source signal is the mixed color signal, and determining the target chip from each blue chip according to the cumulative use duration of each blue chip.

\* \* \* \* \*